US010735340B2

(12) United States Patent
Wu et al.

(10) Patent No.: US 10,735,340 B2
(45) Date of Patent: Aug. 4, 2020

(54) SYSTEM AND METHOD FOR MAXIMIZING PORT BANDWIDTH WITH MULTI-CHANNEL DATA PATHS

(71) Applicant: Avago Technologies International Sales PTE. Limited, Singapore (SG)

(72) Inventors: Kenny Wu, Saratoga, CA (US); Gregorio Gervasio, Jr., Santa Clara, CA (US); Lalit Chhabra, Fremont, CA (US); Ravi Shenoy, Sunnyvale, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/956,633

(22) Filed: Apr. 18, 2018

(65) Prior Publication Data
US 2019/0327178 A1    Oct. 24, 2019

(51) Int. Cl.
*H04L 12/863*   (2013.01)
*H04L 12/891*   (2013.01)
*H04L 12/935*   (2013.01)
*H04L 12/861*   (2013.01)

(52) U.S. Cl.
CPC .......... *H04L 47/6255* (2013.01); *H04L 47/41* (2013.01); *H04L 47/6225* (2013.01); *H04L 49/3027* (2013.01); *H04L 49/3045* (2013.01); *H04L 49/90* (2013.01)

(58) Field of Classification Search
None
See application file for complete search history.

(56) References Cited

U.S. PATENT DOCUMENTS

| 7,669,000 B2 | 2/2010 | Sharma et al. |
| 7,813,271 B2 | 10/2010 | Fourcand |
| 7,936,770 B1* | 5/2011 | Frattura ................. H04L 49/90 370/351 |
| 2007/0113023 A1 | 5/2007 | Arulambalam et al. |
| 2011/0310907 A1 | 12/2011 | Klein et al. |
| 2013/0060968 A1* | 3/2013 | Kotzur ................. G06F 13/385 710/8 |

(Continued)

FOREIGN PATENT DOCUMENTS

| EP | 2688243 | 1/2014 |
| EP | 3035563 | 6/2016 |

OTHER PUBLICATIONS

Extended Search Report for European Patent Application No. 19167569.3, dated Aug. 14, 2019, 7 pages.

*Primary Examiner* — Christine T Duong
(74) *Attorney, Agent, or Firm* — Morgan, Lewis & Bockius LLP (57) ABSTRACT

A networking adaptor and method of transferring data are depicted and described herein. One example of the networking adaptor is provided with a host interface and a network interface. The network interface may include a transmit portion and a receive portion. The transmit portion may include a first set of data paths and the receive portion may include a second set of data paths. Both the first set of data paths and second set of data paths are configurable to be aggregated or de-aggregated to support a single port operation that represents a combined bandwidth of the data paths in the first set of data paths or the second set of data paths.

20 Claims, 5 Drawing Sheets

(56) References Cited

U.S. PATENT DOCUMENTS

| | | | |
|---|---|---|---|
| 2013/0080829 A1* | 3/2013 | Colline | G06F 11/0727 |
| | | | 714/6.22 |
| 2016/0308641 A1 | 10/2016 | Zeng et al. | |
| 2017/0212858 A1 | 7/2017 | Chu et al. | |
| 2017/0237518 A1* | 8/2017 | Yang | H04B 10/07 |
| | | | 398/79 |
| 2017/0288779 A1 | 10/2017 | Tatum | |
| 2018/0091358 A1* | 3/2018 | Sasaki | H04L 41/06 |

\* cited by examiner

SYSTEM AND METHOD FOR MAXIMIZING PORT BANDWIDTH WITH MULTI-CHANNEL DATA PATHS

FIELD OF THE DISCLOSURE

The present disclosure is generally directed toward data processing and, more specifically, toward a system and method for supporting data transmission between a host and network.

BACKGROUND

A networking adaptor often supports two or four physical ports connecting to a network (e.g., Ethernet, Fibre Channel, or the like). Typically, each port is associated with a data path capable of supporting one quarter (in a four port case) or half (in a two port case) of throughput of the entire adaptor. In some configurations where there is only one physical port and four data links employed, one data path will need to be capable of supporting the bandwidth requirement of the entire adaptor. That is four or two times of a regular data path bandwidth. Increasing the data path to support four times the throughput will be costly in terms of gate-count, power, and complexity with a wider data path, higher clock frequency and new/rewritten frame parsers to support the wider data path.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any location within a distributed network of components without impacting the operation of the system.

Furthermore, it should be appreciated that the various links connecting the elements can be wired, traces, or wireless links, or any combination thereof, or any other known or later developed element(s) that is capable of supplying and/or communicating data to and from the connected elements. Transmission media used as links, for example, can be any suitable carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any type of methodology, process, mathematical operation or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-6, various systems and methods for enabling data transmission between a host device and a network will be described in accordance with at least some embodiments of the present disclosure. While particular embodiments will be described in connection with facilitating communications between a host and a particular type of network (e.g., a communication network or storage area network), it should be appreciated that embodiments of the present disclosure are not so limited. For example, the methods and systems described herein may be utilized to improve the transmission efficiency between any two types of nodes, whether or not those nodes correspond to a host device or a particular type of network.

One aspect of the present disclosure is to provide a solution which leverages all data paths in an adaptor (e.g., an adaptor chip, a networking adaptor, or the like) with the minimum additions of logic and memory to support the performance necessary for single port operations. The disclosed adaptor and method utilizes the distribution of commands or frames to multiple or all data paths on ingress (e.g., commands or frames received from a host) and multiplexes them to a single port on egress (e.g., when transmitted to a network-side of the adaptor).

Another aspect of the present disclosure is to provide an adaptor and methods for maximizing single port bandwidth with multiple channels of data paths. Often times, one channel of a data path is not capable of meeting the high single-port bandwidth requirement for a particular application. The disclosed embodiments leverage multiple or all data paths (e.g., two, three, or four data paths) in a chip even in a single port mode. This enables the adaptor to acquire the performance necessary for full bandwidth single-port operations. As a non-limiting example, the disclosed adaptor can support a 128G Fibre Channel (FC) port with four 32G data paths without departing from the scope of the present disclosure.

In some embodiments, a networking adaptor is provided with a host interface and a network interface. The network interface may include a transmit portion and a receive portion. The transmit portion may include a first set of data paths and the receive portion may include a second set of data paths. Both the first set of data paths and second set of data paths are configurable to be aggregated or de-aggregated to support a single port operation that represents a combined bandwidth of the data paths in the first set of data paths or the second set of data paths.

In some embodiments, the transmit portion includes a multiplexer that connects the data paths in the first set of data paths to a number of different data ports that belong to the network interface. The multiplexer may facilitate the aggregation of the data paths in the first set of data paths. The multiplexer may receive inputs from a set of transmission buffers and the set of transmission buffers may couple the first set of data paths to the multiplexer. Alternatively or additionally, the multiplexer aggregates the first set of data paths for a command based on an input key included in the command and the input key includes at least one of a work queue identifier and an exchange identifier along with a modulo operation that is applied to the input key. Alternatively or additionally, the multiplexer further includes an egress arbiter that is used to select and multiplex one of the data paths from the first set of data paths for frame transmission when a data path in the first set of data paths has at least one frame available to transmit in a round-robin fashion between the first set of data paths.

In some embodiments, the receive portion includes a de-multiplexer that de-aggregates and distributes frames between the second set of data paths. The de-multiplexer may assign and mark a serial number onto a beginning of each frame before the frame is de-multiplexed into one of the second set of data paths. The de-multiplexer may also provide each frame to a set of receive buffers and the set of receive buffers couples the second set of data paths to the de-multiplexer.

In some embodiments, the networking adaptor may further includes a buffer manager that uses the serial number to reorder frames prior to providing the frames to the host interface.

As can be appreciated, any of the networking adaptor components depicted and described herein may be implemented as on-chip solutions (e.g., as a single silicon wafer). In some embodiments, the networking adaptor components may be implemented in an Integrated Circuit (IC) chip having other circuit elements provided therein.

Figure 1:
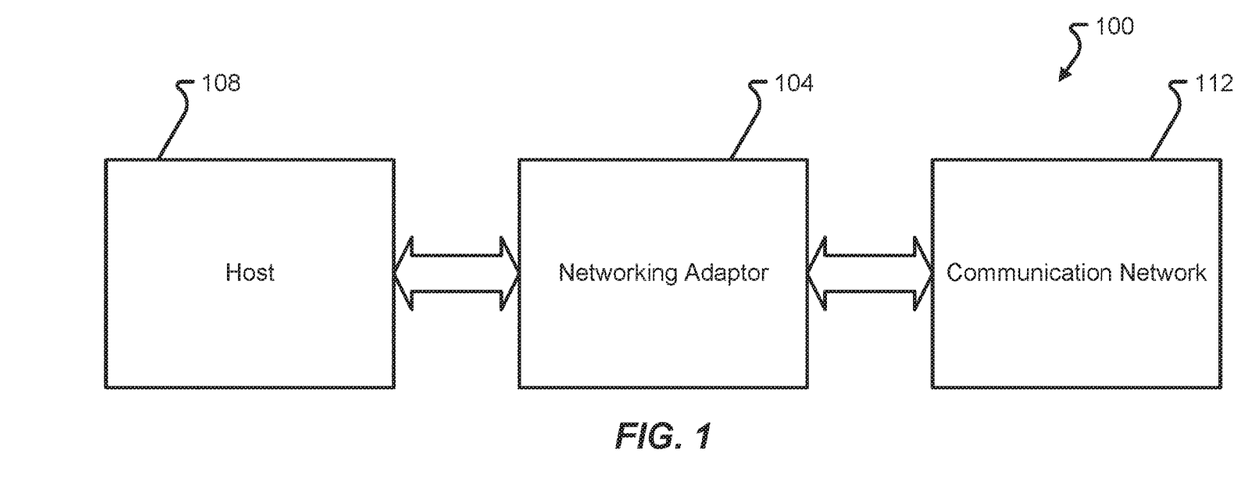
FIG. 1 is a block diagram depicting a first data transmission system in accordance with at least some embodiments of the present disclosure.

With reference now to FIG. 1, additional details of a first data transmission system 100 will be described in accordance with at least some embodiments of the present disclosure. The data transmission system 100 is shown to include a host device 108 and a communication network 112 connected with a networking adaptor 104. In some embodiments, the networking adaptor 104 may be provided as part of a network card or board within a host device 108. In other embodiments, the networking adaptor 104 is provided on one or more separate components from the host device 108. As can be appreciated, the networking adaptor 104 facilitates the transfer of data between the host device 108 and communication network 112.

The adaptor 104 may provide data/protocol translation services, addressing services, and other services. In some embodiments, the networking adaptor 104 is provided as a hardware device and possibly one or more software/firmware components that convert data transmitted from one presentation format to another. For instance, the adaptor 104 may include hardware and software/firmware components that enable data transmitted by the host 108 to be placed onto the communication network 112 consistent with data formatting requirements of the communication network 112. Conversely, the adaptor 104 may include hardware and software/firmware components that enable data received from the communication network 112 to be provided to the host 108 consistent with data formatting requirements of the host 108. As a non-limiting example, the adaptor 104 may include or be provided as part of a network interface controller (NIC), network interface card, LAN adaptor, or physical network interface. As will be described in further detail herein, some or all components of the adaptor 104 may be provided in a single IC chip. The adaptor 104 may be designed with the aim of minimizing additions of logic and memory while supporting high bandwidth single-port operations that is two times or four times of the bandwidth supported by a single data path. The adaptor 104 may also be configured to maintain a minimum gate-count/die-size, cost, and power without implementing a high single-port bandwidth data path that needs to support up to four times the throughput of one regular data path.

The host device 108 may correspond to a personal computer, a laptop, a server, or any other device that includes a local processor and memory. In some embodiments, the host 108 may include a user interface that enables a user to directly interact with other hardware components of the host 108. Data connectivity between the host 108 and communication network 112 may be facilitated by the adaptor 104.

The communication network 112 may correspond to a packet-based communication network. As one non-limiting example, the communication network 112 may correspond to an IP-based communication network and may use communication protocols such as the Ethernet protocol. It should be appreciated that the communication network 112 does not necessarily need to be limited to an Ethernet-based communication network, but rather any interconnected collection of computing devices using any type of communication protocol or combination of communication protocols may qualify as the communication network 112.

Figure 2:
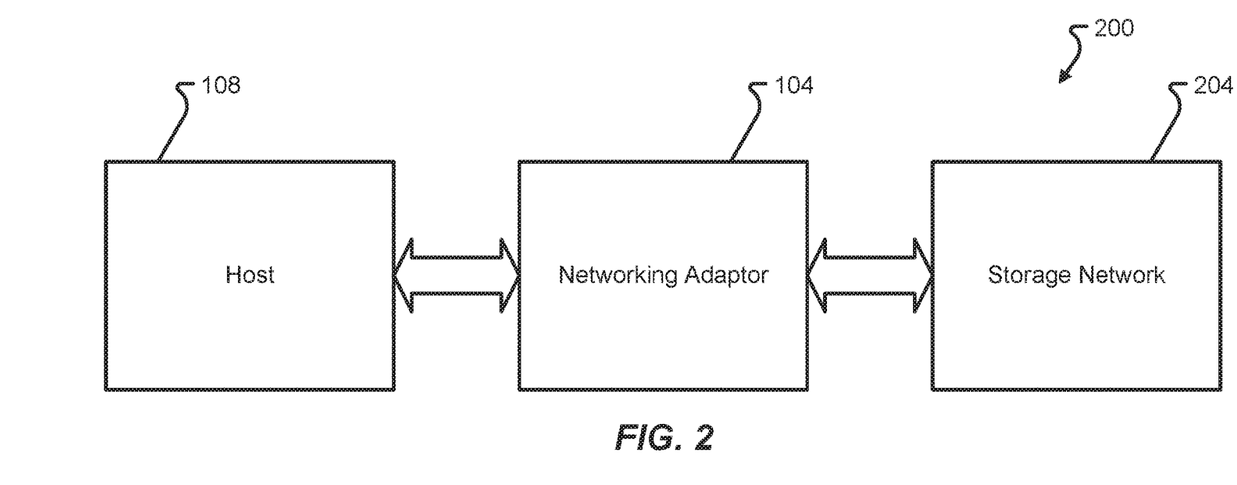
FIG. 2 is a block diagram depicting a second data transmission system in accordance with at least some embodiments of the present disclosure.

With reference now to FIG. 2, an alternative data transmission system 200 will be described in accordance with at least some embodiments of the present disclosure. The system 200 is similar to system 100 in that a host 108 utilizes an adaptor 104 to communicate with a broader network. However, the network in system 200 is shown as a storage network 204. A more specific but non-limiting example of the storage network 204 may correspond to a Fibre Channel Storage Area Network (SAN) or the like. In some embodiments, the storage network 204 may include a collection of storage devices and/or a data storage controller connected to the adaptor 104 and the host 108 may be configured to storage data to the storage devices of the storage network 204 for safe keeping and/or later retrieval.

Figure 3:
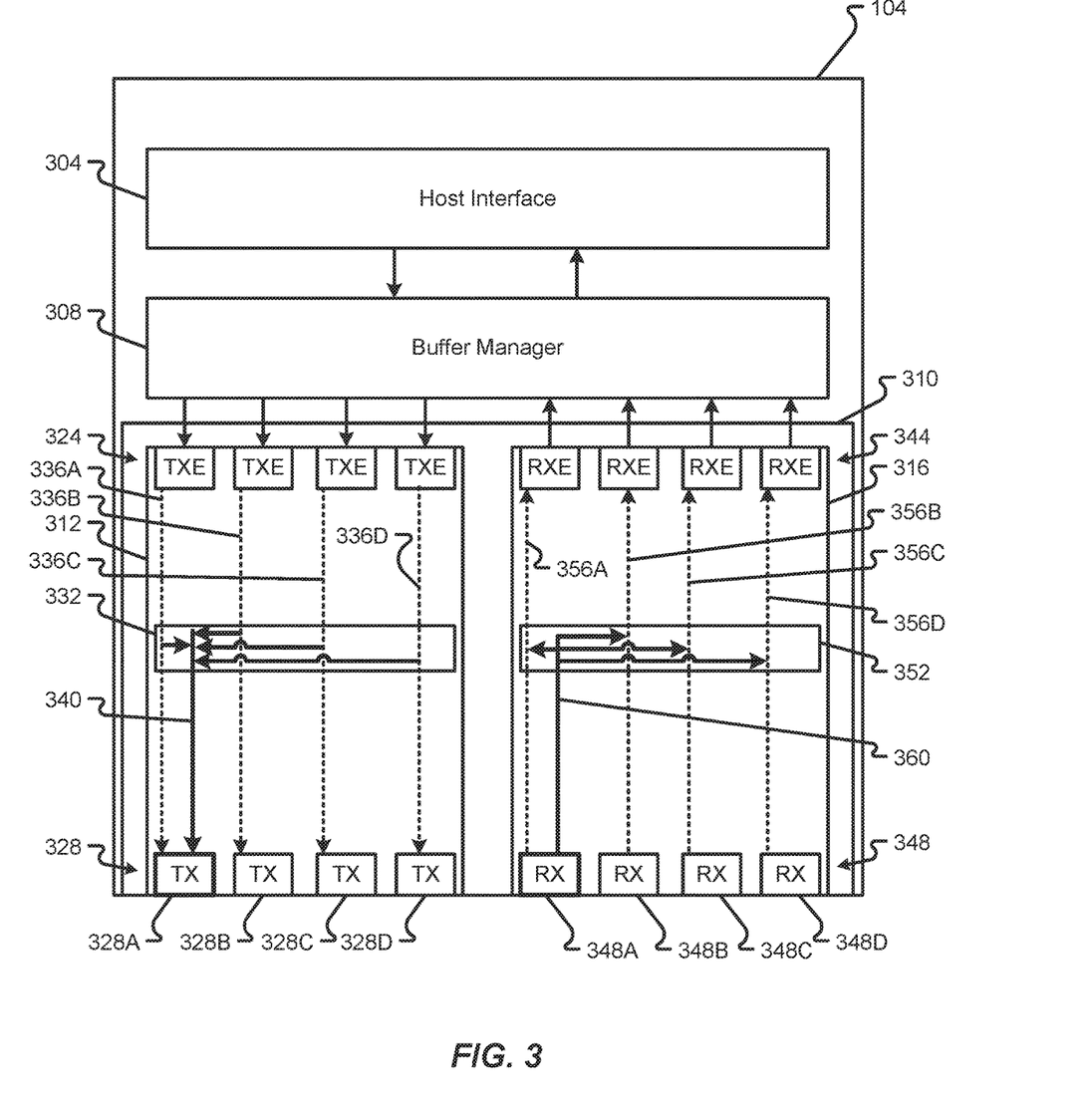
FIG. 3 is a block diagram depicting an illustrative networking adaptor in accordance with at least some embodiments of the present disclosure.

With reference now to FIG. 3, additional details of a networking adaptor 104 will be described in accordance with at least some embodiments of the present disclosure. The adaptor 104 is shown to include a host interface 304 and a network interface 310 that are interconnected to one another by a buffer manager 308. The network interface 310 may correspond to or include a number of components that enable data communication with a network 112, 204 whereas the host interface 304 may correspond to or include a number of components that enable data communication with a host 108. The host 108 is shown to have a single data transmission path that provides data to the buffer manager 308 and a single data transmission path that receives data from the buffer manager 308. Although only two data paths are depicted, it should be appreciated that more than two data paths may be provided between the buffer manager 308 and host interface 304 without departing from the scope of the present disclosure.

The network interface 310 is shown to include a transmit portion 312 and a receive portion 316. The transmit portion 312 is shown to include a first set of data paths 336A-D along with a combined data path 340. The first set of data paths 336A-D pass through a first set of transmission engines 324. The transmission engines 324 may be independently connectable to transmission ports 328 via data paths 336A-D. The transmission engines 324 may also be configured to collectively transmit data on a single one of the data ports (e.g., the first data port 328A). In some embodiments, the data paths 336A-D may all into an aggregation engine 332 that is capable of aggregating the data paths 336A-D into the combined data path 340 or allowing the data paths 336A-D to remain independent. The combined data path 340 can be used to support a single port operation that represents a combined bandwidth of the data paths 336A-D in the first set of data paths.

As a non-limiting example, the aggregation engine 332 may comprise a multiplexer and/or an arbitration engine that is configured to aggregate data received from a plurality of the transmission engines 324 onto data path 340 for transmission by a single port 328A. In some embodiments, the bandwidth capabilities of the transmission engines corresponds to one fourth (¼) the bandwidth capabilities of the first port 328A. In other words, the sum of the bandwidth capabilities of the transmission engines 324 is equal to the bandwidth capabilities of the first port 328A. Of course, the first port 328A can also transmit data at a lower bandwidth, which means that it can transmit data from fewer than all of the transmission engines 324. For instance, the first port 328A can transmit data from data path 336A or from a combination of data paths 336A, 336B, 336C, and/or 336D. It should be appreciated that the transmission portion 312 may have a greater or lesser number of transmission engines 324 than depicted without departing from the scope of the present disclosure. If, for example, the transmission portion 312 were provided with three transmission engines 324, then the bandwidth capabilities of the first transmission port 328A may be three times greater than the bandwidth capabilities of a single transmission engine 324. The other transmission ports 328B-D are shown to only support the bandwidth capabilities of a single transmission engine 324. Thus, the aggregation engine 332 may be capable of selectively performing 4-to-1 multiplexing onto data path 340 or enabling 1-to-1 data transmission between a transmission engine 324 and transmission port 328A-D. In the depicted embodiment, the number of transmission ports 328 is equal to the number of transmission engines 324.

Although not depicted, the transmission engines 324 may comprise hardware and software/firmware components that facilitate the creation of a data path 336A-D. In some embodiments, the transmission engines 324 may comprise one or more digital circuit components that can receive a frame of data from the buffer manager 308 and prepare the data for transmission on a transmission port 328A-D. The transmission engines 324 each have a different data path 336A-D flowing therefrom. The data paths 336A-D are fed into the aggregation engine 332, which selectively combines or redistributes data frames onto one of the transmission ports 328. Non-limiting examples of a transmission port include a Serializer/Deserializer (SerDes), MLD/PCS/FEC, and MAC. Depending upon the type of network to which the adaptor 104 is connected, the transmission ports 328 may correspond to Fibre Channel ports, Ethernet ports, or the like.

The receiving portion 316 of the network interface 310 is similar to the transmitting portion 312 in that the receiving portion 316 includes a plurality receiving ports 348A-D, a de-aggregation engine 352, and a plurality of receiving engines 344. The receiving ports 348 may each be connected with the de-aggregation engine 352. One of the receiving ports (e.g., the first receiving port 348A) may have a bandwidth capability that is larger than the bandwidth capability of any single receiving engine 344. As such, the de-aggregation engine 352 may be configured to de-aggregate data received from the first receiving port 348A for transmission to a plurality of the receiving engines 344. In some embodiments, the de-aggregation engine 352 is configured to support a single port operation for the first receiving port 348A that represents a combined bandwidth of the data paths 356A-D that are provided to the independent receiving engines 344. The de-aggregation engine 352 may further distribute frames received from the receiving ports 348A-D between the various receiving engines 344. Similar to the transmitting engines, the receiving engines 344 may include one or more digital circuit components that can receive a frame from the de-aggregation engine 352 and prepare the data for transmission to the host 108 via the host interface 304. Also like the transmitting ports 328, the receiving ports 348 may include one or more of a SerDes, MLD/PCS/FEC, and MAC.

In some embodiments, when a frame is received at a receiving port 348A-D and provided to the de-aggregation engine 352, the de-aggregation engine may assign and mark a serial number onto the beginning of each frame before it is de-multiplexed into one of the receive data paths 356A-D. The buffer manager 308 may then utilize the serial number to reorder the frames prior to processing and offloading the frames to the host interface 304. As can be appreciated, each serial number used by the de-aggregator 352 may be unique (e.g., globally unique or locally unique) and may be incremented from 0 to N without any gaps in between. After the de-aggregator 352 has used the serial number N, the de-aggregator 352 may return back to using zero for another, different, frame. The value of N should be a number that is large enough to cover the number of frames that can be in flight in all of the receive data paths 356A-D. As will be described in further detail, the buffer manager 308 may further include one or more Virtual Output Queues (VOQs). The input key that is used for distribution of frames by the buffer manager may be obtained from frame itself, from the frame header, or from a table lookup. This allows multiple channels of Direct Memory Access (DMA) engines to be used to support the necessary throughout for high bandwidth single-port operations.

Figure 4:
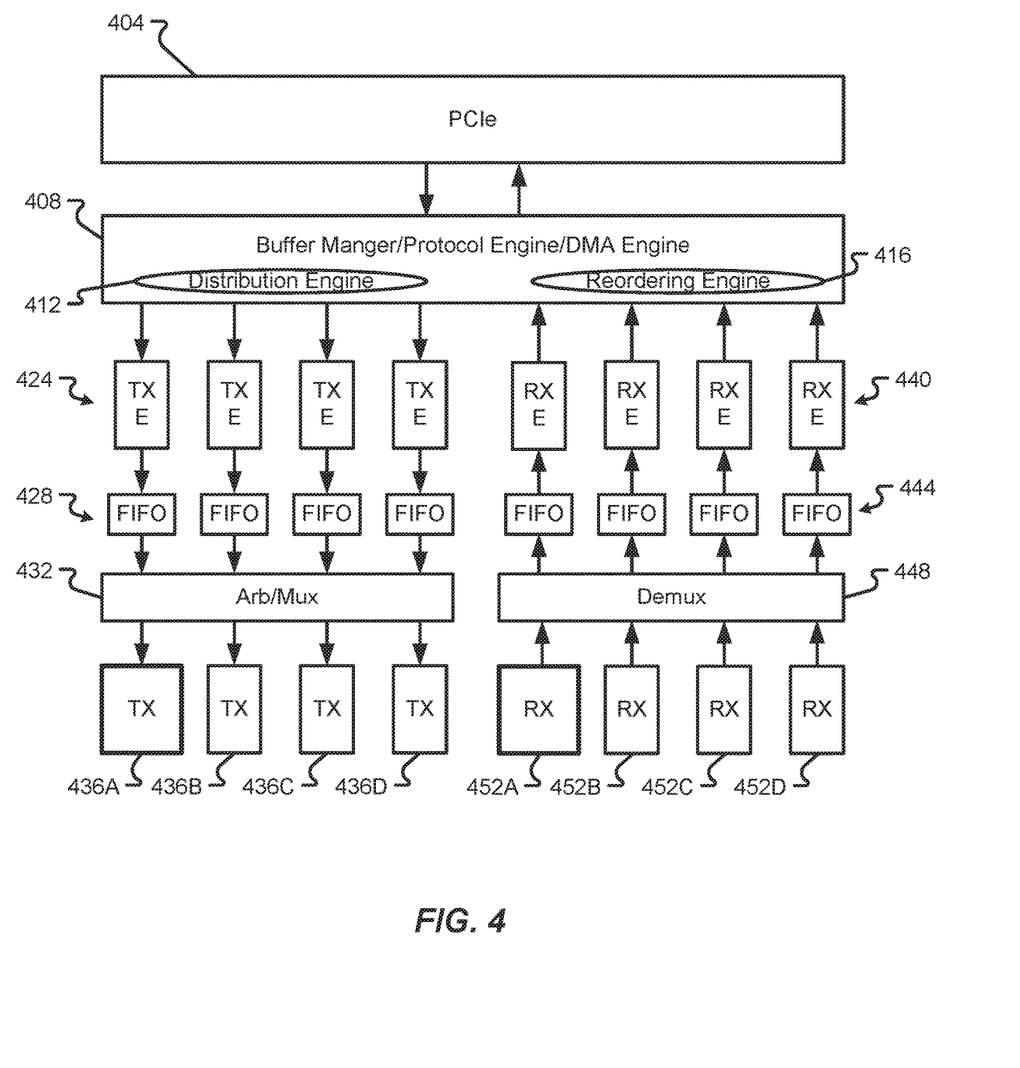
FIG. 4 is a block diagram depicting additional details of an illustrative networking adaptor in accordance with at least some embodiments of the present disclosure.

With reference now to FIG. 4, additional details of an illustrative adaptor 104 will be described in accordance with at least some embodiments of the present disclosure. The adaptor 104 may have similar components to those depicted and described in connection with FIG. 3; however, more detailed components of the transmit and receive portions are shown in this particular figure.

This particular example of an adaptor 104 is shown to have a host interface 304 in the form of a PCIe interface 404. The PCIe interface 404 is connected to a buffer manager/protocol engine/DMA engine 408. A distribution engine 412 and reordering engine 416 may be provided within the buffer manager/protocol engine/DMA engine 408. The distribution engine 412 may be responsible for placing commands onto the transmission engines 424 whereas the reordering engine 416 is responsible for processing and reordering frames received at the receiving engines 440.

Each transmission engine 424 is connected to a dedicated buffer 428. The transmission engines 424 may each correspond to a data path for frame transmission in the transmission side. In the depicted embodiment, the buffers 428 correspond to FIFO buffers. At the egress side of each transmission engine 424 (e.g., at each transmission data path 336A-D), the buffers 428 are used to hold at least one maximum sized frame to ensure that the data path 336A-D can deliver the frame at the high single-port speed without underflow, even though the adaptor is allowed to have large inter-frame gaps in the data path. The buffer 428 output data bus should be wide enough to support the full single port throughput for a maximum sized frame without underflow, meaning there is no data gap within a frame delivery.

An egress arbiter and multiplexer 432 is used to select and multiplex one of the data paths 336a-D for frame transmission via a transmission port 436A-D onto the networking link when the data path has at least one frame available to transmit in a round-robin fashion between data paths. The egress arbiter and multiplexer 432 may contain a logic circuit or firmware that helps determine what frames should be transmitted and when. The egress arbiter and multiplexer 432 may correspond to an example of the aggregation engine 332. The egress arbiter and multiplexer 432 may also contain one or more multiplexers that multiplex data from multiple data paths onto the combined path for transmission via transmission port 436A (e.g., the port having the larger bandwidth than any one of the transmission engines). In some embodiments, the first transmission port 436A may correspond to a Fibre Channel transmission port that is capable of transmitting between 32G and 128G. The second, third, and fourth transmission ports 436B-D may correspond to Fibre Channel transmission ports that are capable of each transmitting up to 32G. The bandwidth capabilities of the second, third, and fourth transmission ports 436B-D may be similar or identical to the bandwidth capabilities of the transmission engines 424.

Collectively, components 412, 424, 428, 432, and 436A-D may be considered components that form the transmit portion of the adaptor 104. It should be appreciated that the transmit portion may all be implemented on a single IC chip. In other embodiments, some components of the transmit portion may be implemented on different IC chips.

The receive portion of the adaptor may also include a number of components that enable data transmission between the host and network. The receive portion is shown to include a plurality of receiving engines 440, a plurality of buffers 444, a demultiplexer 448, and a plurality of receiving ports 452A-D. The first receiving port 452A may have bandwidth capabilities that equal a sum of bandwidth capabilities of the plurality of receiving engines 440. For instance, each receiving engine 440 may have a bandwidth capability of 32G. The first receiving port 452A may have a bandwidth capability between 32G and 128G. The other receiving ports 452B-D may be capable of transmitting up to 32G.

The receiving ports 452A-D may be responsible for receiving frames from a network. Examples of receiving ports 452A-D include SerDes, MLD/PCS/FEC, and MAC. The received frames are provided to the demultiplexer 448, which assigns and marks a serial number onto the beginning of each frame before the frame is demultiplexed into one of the receive data paths' buffers 444. The demultiplexer 448 may correspond to an example of the de-aggregation engine 352. To distribute the receive loads, the demultiplexer 448 selects the receive data path (e.g., selects one of the buffers from among the plurality of buffers 444) based on a load of the buffers. In some embodiments, the demultiplexer 448 selects the least filled buffer to receive the next frame. Each buffer 444 should be sized to hold at least two maximum sized frames and the input data bus for each buffer 444 should be wide enough to support the full single port throughput for a maximum sized frame without overflow. Said another way, the sizing of buffers 444 is made based on the bandwidth capabilities of the highest bandwidth receiving port (e.g., the first receiving port 452A). In some embodiments, the sizing of buffers 444 may be a function of one or multiple variables including, without limitation, incoming (receiving port) bandwidth, processing bandwidth of a receiving engine, and maximum frame size.

Frames are ordered in the buffer manager 408 using the serial number assigned by the demultiplexer 448. The reordering engine 416 may correspond to the entity of the buffer manager 408 responsible for applying the reordering logic. The frames are subsequently processed and offloaded in the order received with respect to each flow. For placement to the host, frames are further distributed to multiple VOQs. The input key used for distribution among the VOQs may correspond to an identifier obtained from the frame header or from a local lookup table stored in the buffer manager 408. The utilization of the multiple VOQs allows multiple channels (e.g., receiving engines 440) to be used to support the throughput necessary for high bandwidth single-port operations.

Figure 5:
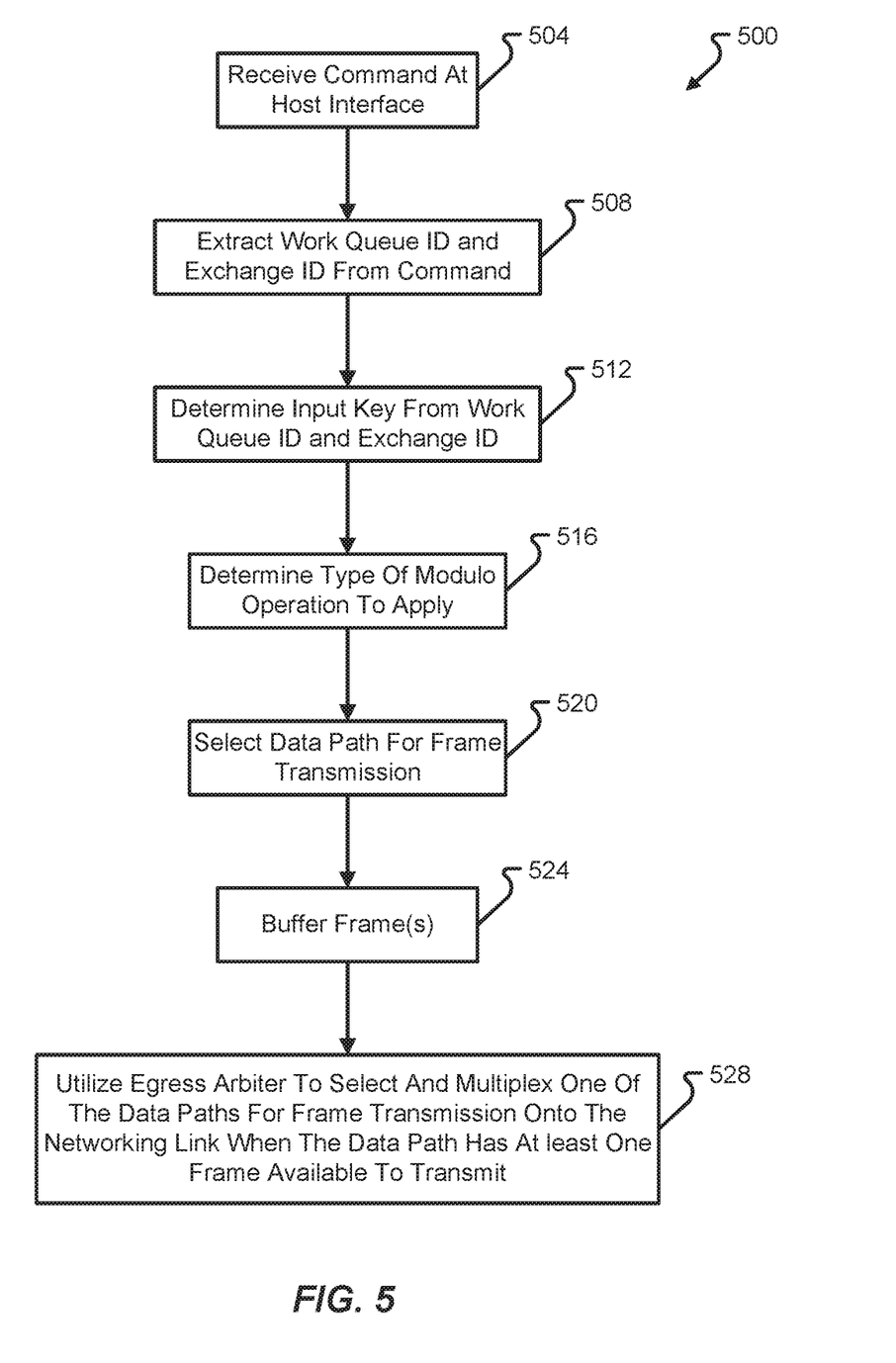
FIG. 5 is a flow diagram depicting a method of enabling data transmission from a host to a network in accordance with at least some embodiments of the present disclosure.

With reference now to FIG. 5, a method 500 of facilitating data transfer from a host 104 to a network 112, 204 will be described in accordance with at least some embodiments of the present disclosure. The method begins when a command is received at the host interface 304 or PCIe 404 (step 504).

The method continues with the command being passed to the buffer manager 308, 408 where a work queue identifier (WQ_ID) and/or exchange identifier (XID) are extracted from the command (step 508). It should be clarified that the use of the term exchange identifier (XID) in Fibre Channel is analogous to a "connection identifier" in Ethernet. Since embodiments of the present disclosure may also apply to Ethernet, a person of ordinary skill in the art will appreciated that the use of the term exchange identifier or XID may be interchangeable with connection identifiers or other similar terms used in connection with other protocols such as ordering identifier, flow identifier, etc. The use of the term exchange identifier or XID is not intended to limit the scope of the claims to only Fibre Channel solutions.

The buffer manager 308, 408 then determines an input key that will be used to distribute the command from among other commands between the data paths of the transmitting portion (step 512). A modulo 2, 3, or 4 operations (depending upon the number of data paths to use) is applied to the command using the input key (WQ_ID or XID) (step 516). The method continues with the buffer manager acquiring a number that selects the data path for frame transmission (step 520).

At the egress side of each data path, a FIFO buffer may be added to hold at least one maximum sized frame. Thus, the method may continue by buffering the frame(s) in one or more buffer frames prior to providing the frame(s) to the aggregation engine/egress arbitration and multiplexer. The method continues with the egress arbiter selecting and multiplexing one of the data paths for frame transmission onto the networking link (e.g., the appropriate transmission port) when the data path has at least one frame available to transmit (step 528). In some embodiments, the frame is transmitted in a round-robin fashion between the various transmission ports.

Figure 6:
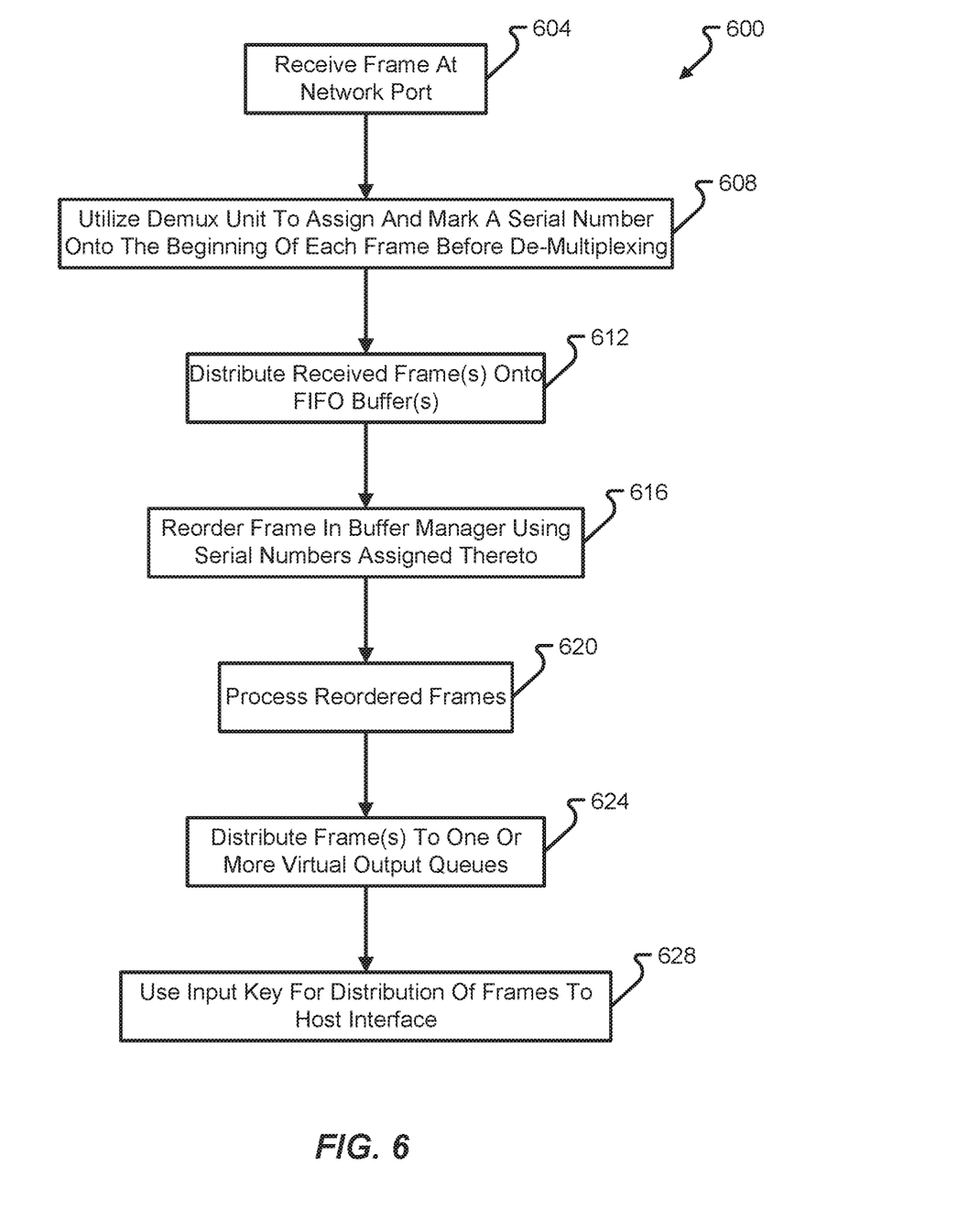
FIG. 6 is a flow diagram depicting a method of enabling data transmission from a network to a host in accordance with at least some embodiments of the present disclosure.

With reference now to FIG. 6, a method 600 of facilitating data transfer to a host 104 from a network 112, 204 will be described in accordance with at least some embodiments of the present disclosure. The method begins when a frame is received at a receiving port (step 604). The received frame is passed to the de-aggregation engine/demultiplexer where the frame is assigned and marked with a serial number onto the beginning of the frame (step 608). The serial number assignment and marking is performed and then the frame is demultiplexed into one of the receive data paths by placing the demultiplexed frame onto one or more buffers 444 (step 612). In some embodiments, the demultiplexed frame is distributed across one or a plurality of buffers 440, depending upon the size of the frame (e.g., whether the frame was received at the first receiving port 452A or a smaller receiving port). To distribute the receive loads, the demultiplexer may select the receive data path with the least filled buffer 444.

Thereafter, the frames are passed through the respective receiving engines 440 and then provided to the buffer manager 408. The buffer manager 408 utilizes the reordering engine 416 to reorder the frames according to their assigned serial numbers (step 616). The reordered frames are then processed and offloaded in the order received with respect to each flow (step 620).

In some embodiments, each serial number is unique and is incremented as integer values from 0 to N without gaps in between; after N, the demultiplexer 448 returns back to zero. It should be appreciated that the value of N should be a number that's large enough to cover the number of frames that can be inflight in all receive data paths.

For data placements to a host 108, frames are further distributed to multiple VOQs (step 624). The input key that is used for distribution is XID or Receive Queue ID (RQ_ID) obtained from the frame header or a table lookup maintained in the buffer manager 408 (step 628). This allows multiple channels of DMA engines to be used to support the throughput necessary for high bandwidth single-port operations.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A networking adaptor, comprising:
a host interface; and
a network interface, wherein the network interface includes a transmit portion and a receive portion, wherein the transmit portion comprises a first set of data paths and wherein the receive portion comprises a second set of data paths, wherein the first set of data paths are configurable to be aggregated to support a single port transmit operation that represents a combined bandwidth of the data paths in the first set of data paths, wherein the second set of data paths are configurable to be de-aggregated to support a single port receive operation that represents a combined bandwidth of the data paths in the second set of data paths, wherein the first set of data paths are different from the second set of data paths, wherein the receive portion comprises a de-multiplexer that de-aggregates and distributes frames between the second set of data paths, and wherein the de-multiplexer assigns and marks a serial number onto a beginning of each frame before the frame is de-multiplexed into one of the second set of data paths.

2. The networking adaptor of claim 1, wherein the transmit portion comprises a multiplexer that connects the data paths in the first set of data paths to a number of different data ports that belong to the network interface.

3. The networking adaptor of claim 2, wherein the multiplexer facilitates the aggregation of the data paths in the first set of data paths.

4. The networking adaptor of claim 3, wherein the multiplexer receives inputs from a set of transmission buffers, wherein the set of transmission buffers couple the first set of data paths to the multiplexer.

5. The networking adaptor of claim 4, wherein the multiplexer aggregates the first set of data paths for a command based on an input key included in the command, wherein the input key comprises at least one of a work queue identifier and an exchange identifier along with a modulo operation that is applied to the input key.

6. The networking adaptor of claim 4, wherein the multiplexer further comprises an egress arbiter that is used to select and multiplex one of the data paths from the first set of data paths for frame transmission when a data path in the first set of data paths has at least one frame available to transmit in a round-robin fashion between the first set of data paths.

7. The networking adaptor of claim 1, wherein the host interface comprises a PCIe interface.

8. The networking adaptor of claim 7, wherein at least one of the transmit portion and the receive portion includes a Fibre Channel (FC) port.

9. The networking adaptor of claim 1, wherein the de-multiplexer provides each frame to a set of receive buffers, wherein the set of receive buffers couples the second set of data paths to the de-multiplexer.

10. The networking adaptor of claim 9, further comprising:
a buffer manager that uses the serial number to reorder the frames prior to providing the frames to the host interface.

11. A method of transferring commands from a host to a network, the method comprising:
receiving a command at a host interface;
distributing the command among a first set of data paths, wherein each data path in the first set of data paths have substantially a first bandwidth;
multiplexing the command onto one network port when the command requires more than the first bandwidth; and
transmitting the command via the one network port.

12. The method of claim 11, wherein the one network port comprises a bandwidth that is a product of the first bandwidth and a number of data paths in the first set of data paths.

13. The method of claim 11, further comprising:
placing the distributed command onto a plurality of transmission buffers to ensure that the one network port can deliver a frame at the bandwidth provided by the one network port.

14. A method of transferring commands from a network to a host, the method comprising:
receiving a frame at a network port;
utilizing a de-multiplexer to assign and mark a serial number onto a beginning of the frame;
de-multiplexing the frame with the de-multiplexer to create a de-multiplexed frame;
distributing the de-multiplexed frame among a set of receive data paths, wherein each data path in the set of data paths comprises a bandwidth that is less than a bandwidth of the network port;
re-ordering the de-multiplexed frame at an egress of the set of receive data paths; and
providing the re-ordered frame to a host interface.

15. The method of claim 14, further comprising:
providing the de-multiplexed frame to a set of receive buffers.

16. The method of claim 14, further comprising:
distributing frames to multiple virtual output queues.

17. The method of claim 16, wherein an input key is used for the distribution of the frames to the multiple virtual output queues.

18. The method of claim 17, wherein the input key comprises at least one of a work queue identifier and an exchange identifier.

19. The method of claim 18, wherein the input key is obtained from a frame header or a table lookup.

20. The method of claim 14, wherein the host interface comprises a PCIe interface and wherein the network port comprises a plurality of Fibre Channel (FC) ports.

* * * * *